United States Patent
Nishioka (10) Patent No.: US 9,652,085 B2
(45) Date of Patent: *May 16, 2017

(54) SPATIAL INPUT DEVICE

(71) Applicant: Funai Electric Co., Ltd., Daito, Osaka (JP)

(72) Inventor: Ken Nishioka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,064

(22) Filed: Aug. 1, 2016

(65) Prior Publication Data

US 2016/0342283 A1    Nov. 24, 2016

Related U.S. Application Data

(63) Continuation of application No. 15/044,604, filed on Feb. 16, 2016, now Pat. No. 9,423,914, which is a continuation of application No. 14/224,457, filed on Mar. 25, 2014, now Pat. No. 9,292,133.

(30) Foreign Application Priority Data

Apr. 8, 2013    (JP) ................. 2013-080206

(51) Int. Cl.
  *G06F 3/042*    (2006.01)
  *G02B 27/22*    (2006.01)

(52) U.S. Cl.
  CPC ....... *G06F 3/0423* (2013.01); *G02B 27/2292* (2013.01); *G06F 3/0421* (2013.01); *G06F 2203/04101* (2013.01)

(58) Field of Classification Search
  CPC ..... G06F 3/0421; G06F 3/0423; G06F 3/0488
  See application file for complete search history.

(56) References Cited

U.S. PATENT DOCUMENTS

| | | | |
|---|---|---|---|
| 8,035,614 B2 * | 10/2011 | Bell | ........................ G06F 3/011 345/156 |
| 8,053,614 B2 | 11/2011 | Aalto et al. | |
| 2002/0021287 A1 | 2/2002 | Tomasi et al. | |
| 2006/0139314 A1 | 6/2006 | Bell | |

(Continued)

FOREIGN PATENT DOCUMENTS

JP    2010-055507 A    3/2010

OTHER PUBLICATIONS

Extended European Search Report of the corresponding European Application No. 14162175.5, dated Jul. 25, 2014.

*Primary Examiner* — Nalini Mummalaneni
*Assistant Examiner* — Sepeher Azari
(74) *Attorney, Agent, or Firm* — Global IP Counselors, LLP (57) ABSTRACT

A spatial input device includes a light beam scanner that emits light beams toward a spatially projected image while scanning the light beams, a photodetector that detects the light beams that have been reflected by an input object within a detection range, and a controller that counts a scan line number indicative of a number of the light beams that have been detected by the photodetector, and detects a position of the input object according to the counted scan line number using a table that specifies correlation between positions of the input object and scan line numbers.

20 Claims, 10 Drawing Sheets

(56) References Cited

U.S. PATENT DOCUMENTS

| | | | |
|---|---|---|---|
| 2008/0168396 A1 | 7/2008 | Matas et al. | |
| 2010/0110384 A1* | 5/2010 | Maekawa | G02B 5/124 |
| | | | 353/10 |
| 2010/0182219 A1* | 7/2010 | Tomisawa | G02B 27/2292 |
| | | | 345/4 |
| 2010/0225564 A1 | 9/2010 | Tomisawa et al. | |
| 2011/0187678 A1* | 8/2011 | Salaverry | G06F 3/0428 |
| | | | 345/175 |
| 2011/0316679 A1 | 12/2011 | Pihlaja | |
| 2012/0268410 A1 | 10/2012 | King et al. | |
| 2012/0281061 A1* | 11/2012 | Tsujino | G02B 5/136 |
| | | | 348/14.08 |
| 2013/0147711 A1* | 6/2013 | Njolstad | G06F 3/011 |
| | | | 345/158 |

* cited by examiner

SPATIAL INPUT DEVICE

CROSS-REFERENCE TO RELATED APPLICATIONS

This is a continuation application of U.S. patent application Ser. No. 15/044,604, which is a continuation application of U.S. patent application Ser. No. 14/224,457, now U.S. Pat. No. 9,292,133. This application claims priority to Japanese Patent Application No. 2013-080206 filed on Apr. 8, 2013. The entire disclosures of U.S. patent application Ser. Nos. 15/044,604 and 14/224,457 and Japanese Patent Application No. 2013-080206 are hereby incorporated herein by reference.

BACKGROUND

Field of the Invention

The present invention generally relates to a spatial input device.

Background Information

Conventionally, spatial input devices with a virtual user interface are well-known in the art (see Japanese Unexamined Patent Application Publication No. 2010-55507 (Patent Literature 1), for example).

For example, the above-mentioned Patent Literature 1 discloses an input/output device. With this input/output device, when an image is displayed by display elements disposed in unit regions corresponding to microlenses of a microlens array, the displayed image is focused in a spatial plane by the microlens array. With this input/output device, after light from an object used as an indicator, such as a finger, is converged by the microlens array, it is received by imaging elements disposed in the same plane as the display elements. Then, imaging data about the object is acquired. The position of the object is sensed based on this imaging data.

SUMMARY

The three-dimensional position of the object can be detected with the input/output device of the above-mentioned Patent Literature 1. However, this device requires the microlens array or the imaging elements. Thus, the structure of the device becomes complicated.

One aspect is to provide a spatial input device with which a depth position of an input object can be detected with a simple structure.

In view of the state of the known technology, a spatial input device is provided that includes a light beam scanner that emits light beams toward a spatially projected image while scanning the light beams, a photodetector that detects the light beams that have been reflected by an input object within a detection range, and a controller that counts a scan line number indicative of a number of the light beams that have been detected by the photodetector, and detects a position of the input object according to the counted scan line number using a table that specifies correlation between positions of the input object and scan line numbers.

Also other objects, features, aspects and advantages of the present disclosure will become apparent to those skilled in the art from the following detailed description, which, taken in conjunction with the annexed drawings, discloses one embodiment of the spatial input device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1A:
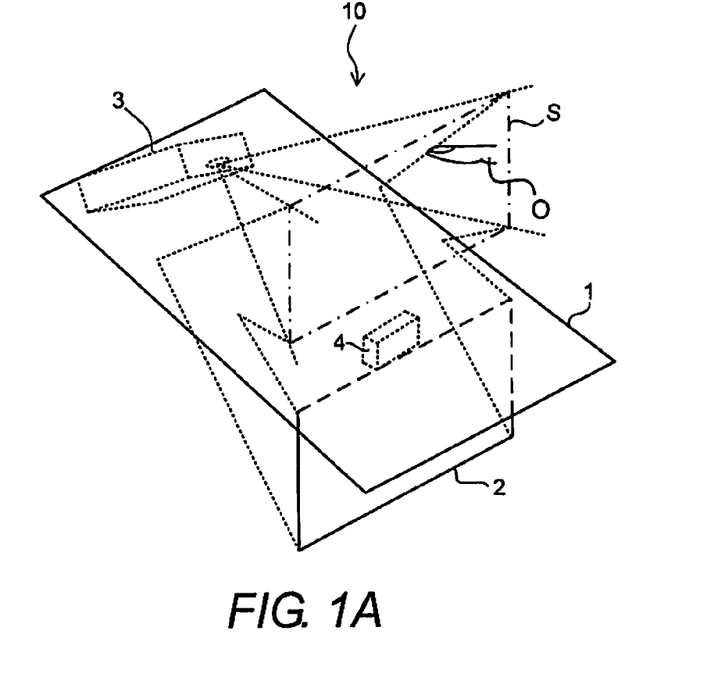
FIG. 1A is a schematic perspective view of an image display device in accordance with one embodiment.
Figure 1B:
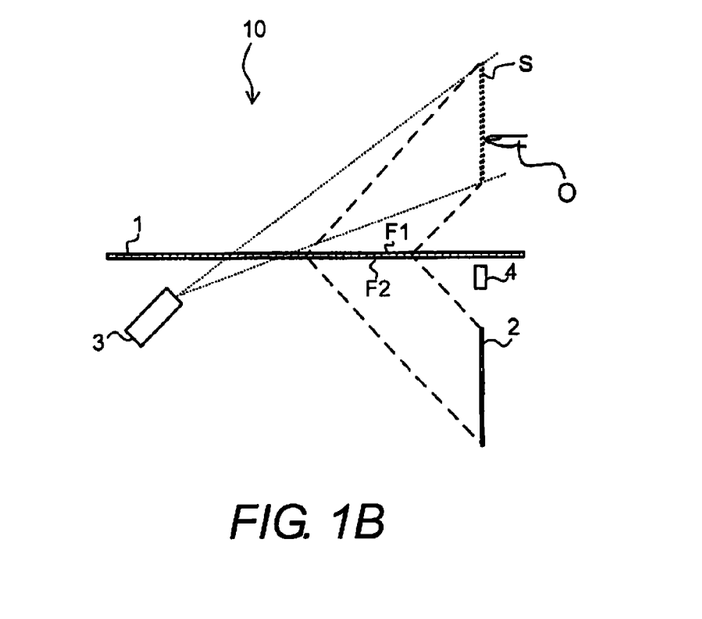
FIG. 1B is a side elevational view of the image display device.

Referring initially to FIGS. 1A and 1B, an image display device 10 (e.g., a spatial input device) is illustrated in accordance with one embodiment. FIG. 1A is a perspective view of the image display device 10. FIG. 1B is a side elevational view of the image display device 10.

Figure 2:
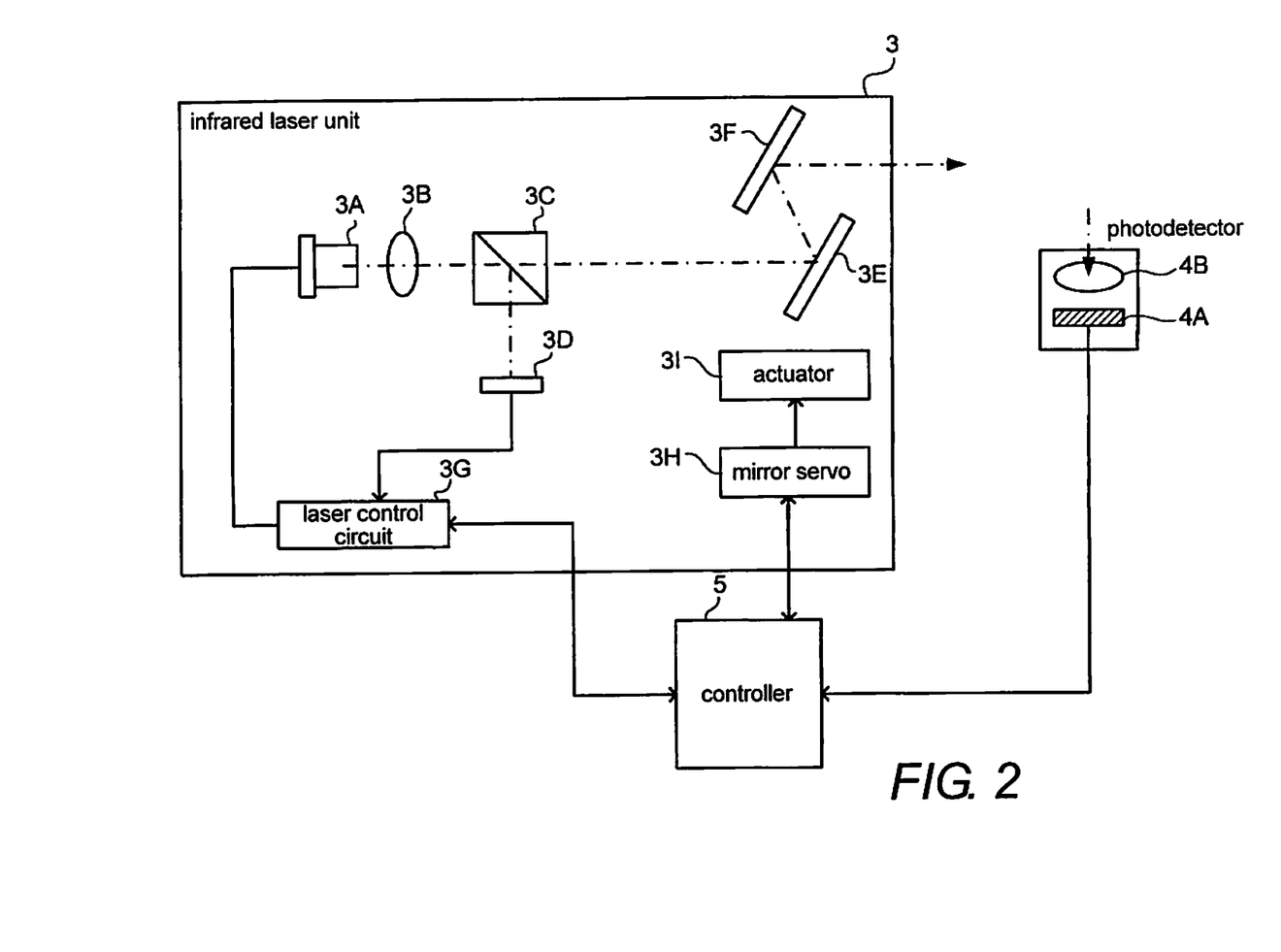
FIG. 2 is a block diagram of an infrared laser unit of the image display device.

The image display device 10 as shown in FIGS. 1A and 1B includes a dihedral corner reflector array substrate 1 (e.g., a reflection element aggregate substrate), a liquid crystal display component 2, an infrared laser unit 3, a photodetector 4, and a controller 5 (see FIG. 2).

The dihedral corner reflector array substrate 1 forms in space an optical image S of the image displayed by the liquid crystal display component 2, allowing the user to view the resulting image.

The dihedral corner reflector array substrate 1 is configured such that a plurality of through-holes, which are square in shape and pass through the main face of the substrate 1 in the vertical direction, are arranged in a zigzag pattern in plan view on the substrate 1. Mirror surfaces are formed as a dihedral corner reflector on two perpendicular faces of the flat inner wall surfaces of each of the through-holes. The dihedral corner reflector array substrate 1 can be a conventional dihedral corner reflector array substrate. Thus, detailed description of the configuration will be omitted for the sake of brevity.

Light rays emitted from a point light source disposed inside a space on one main face F2 side of the substrate 1 (see FIG. 1B) are reflected twice by the dihedral corner reflectors, and curve while passing through the substrate 1. Light rays emitted from the point light source and facing different dihedral corner reflectors are reflected twice by those dihedral corner reflectors, and then formed into a one-point optical image in a space on the main face F1 side. The main face F1 side is on the opposite side of the substrate 1 relative to the main face F2 side of the substrate 1 on which the point light source is located.

The liquid crystal display component 2 (e.g., the liquid crystal display panel) surface-emits image light. However, the liquid crystal display component 2 can be interpreted as a set of the point light sources. Therefore, light rays of the image light that surface-emitted by the liquid crystal display component 2 are reflected by the dihedral corner reflectors and form the optical image S at a position symmetrical to the liquid crystal display component 2 relative to the substrate 1. Specifically, in the illustrated embodiment, the liquid crystal display component 2 is located in the space on the main face F2 side of the substrate 1 (i.e., the space under the main face F2 in FIG. 1B). Thus, the light rays form the optical image S at the position symmetrical to the liquid crystal display component 2 relative to the substrate 1 in the space on the other main face F1 side (i.e., the space above the main face F1 in FIG. 1B). Consequently, the user or observer has the impression that the image is being displayed in the air.

In order for the image display device 10 to function as a virtual user interface, the infrared laser unit 3 is provided for directing an infrared laser light at the optical image S formed by the dihedral corner reflector array substrate 1 as discussed above.

FIG. 2 illustrates a block diagram of the infrared laser unit 3. As shown in FIG. 2, the infrared laser unit 3 includes an infrared LD (Laser Diode) 3A, a collimator lens 3B, a beam splitter 3C, a photodetector 3D, a horizontal MEMS (Micro Electro Mechanical Systems) mirror 3E, a vertical MEMS mirror 3F, a laser control circuit 3G, a mirror servo 3H, and an actuator 3I.

The infrared LD 3A emits a red laser light at a power level controlled by the laser control circuit 3G. The infrared laser light thus emitted is made into a parallel beam by the collimator lens 3B, and is incident on the beam splitter 3C. A part of the light that is incident on the beam splitter 3C is reflected and received by the photodetector 3D. On the other hand, the other part of the light is transmitted and heads toward the horizontal MEMS mirror 3E. The laser control circuit 3G controls the output power of the infrared LD 3A based on the detection signal produced by the photodetector 3D.

The laser light incident on and reflected by the horizontal MEMS mirror 3E is incident on and reflected by the vertical MEMS mirror 3F. The horizontal MEMS mirror 3E deflect the laser light so that it scans in the horizontal direction. The vertical MEMS mirror 3F deflects the laser light so that it scans in the vertical direction. Then, the laser light is emitted to the outside of the housing of the infrared laser unit 3.

The infrared laser unit 3 is disposed in a space on the main face F2 side (see FIG. 1B) of the dihedral corner reflector array substrate 1 on which the liquid crystal display component 2 is located. Thus, the infrared laser light emitted from the infrared laser unit 3 goes through the through-holes in the dihedral corner reflector array substrate 1 and is emitted to the optical image S.

Deflection by the horizontal MEMS mirror 3E and the vertical MEMS mirror 3F causes the laser light emitted from the infrared laser unit 3 to be two-dimensionally scanned with respect to the optical image S.

The mirror servo 3H deflects the horizontal MEMS mirror 3E by driving the actuator 3I according to a horizontal synchronization signal from the controller 5. The mirror servo 3H also deflects the vertical MEMS mirror 3F by driving the actuator 3I according to a vertical synchronization signal from the controller 5.

The photodetector 4 is used to detect the laser light emitted from the infrared laser unit 3 and reflected by an input object O, such as a finger and the like. The photodetector 4 is located in the space on the main face F2 side (see FIG. 1B) of the dihedral corner reflector array substrate 1 on which the liquid crystal display component 2 is located.

Figure 3:
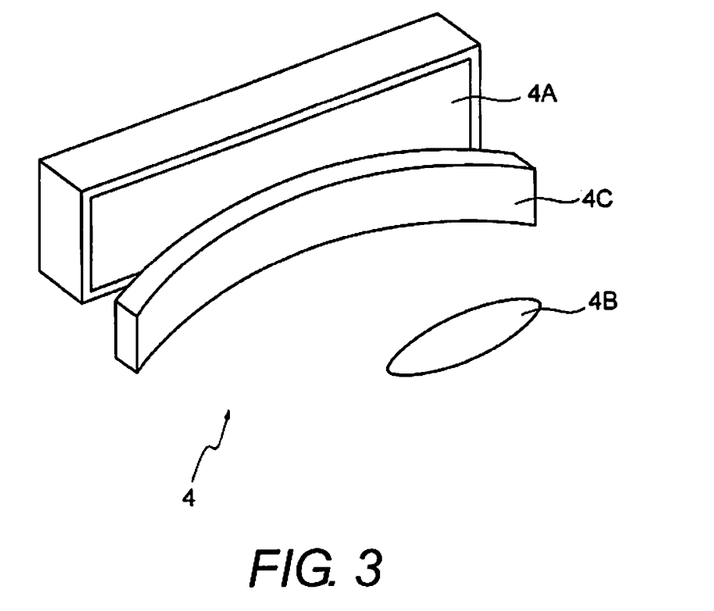
FIG. 3 is an exploded perspective view of a photodetector of the image display device, illustrating the configuration of the interior of a housing of the photodetector.

FIG. 3 is an exploded perspective view of the configuration of the interior of the housing of the photodetector 4. As shown in FIG. 3, the photodetector 4 includes a light receiving element 4A, a converging lens 4B and a flat masking member 4C. The light receiving element 4A, the converging lens 4B and the flat masking member 4C are disposed inside the housing of the photodetector 4. The light receiving element 4A detects irradiation by reflected laser light. The converging lens 4B converges the reflected laser light incident from the window of the housing, and guides it to the light receiving element 4A. The flat masking member 4C is disposed between the light receiving element 4A and the converging lens 4B, and is tall enough to cover part of the light receiving element 4A.

As shown in FIG. 2, the light receiving element 4A is connected to the controller 5, and sends the controller 5 the detection signal produced by the light receiving element 4A.

The masking member 4C has a width in the same direction as the width direction of the light receiving element 4A. The masking member 4C has a curved shape such that its two ends are closer to the converging lens 4B side than the middle part. The masking member 4C restricts irradiation of the light receiving element 4A by blocking the reflected laser light according to the incidence angle on the light receiving element 4A.

The diameter of the spot of the reflected laser light converged by the converging lens 4B and directed to the light receiving element 4A is larger in the ends in the width direction of the light receiving element 4A than the middle part. Therefore, without the masking member 4C, there is the risk that the part of the reflected laser light that is supposed to be blocked by the masking member 4C is not all be blocked because of the increased spot diameter. As a result, the part of the reflected laser light is instead be received by the light receiving element 4A and mistakenly detected. In view of this, the masking member 4C has a curved shape so that the reflected laser light at the ends, which has the larger spot diameter, can be blocked while the spot diameter is still small.

Figure 4:
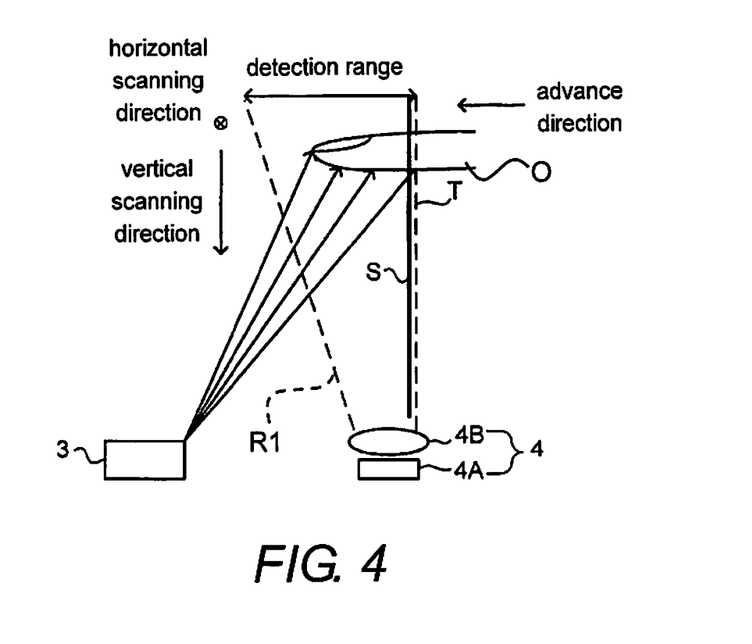
FIG. 4 is a schematic side elevational view of the image display device, illustrating an example of setting a detection range of the photodetector.

The detection range R1 of the photodetector 4 can be adjusted by adjusting the dimensions of the masking member 4C. FIG. 4 illustrates an example of setting the detection range R1 of the photodetector 4. The broken lines in FIG. 4 indicate the boundaries (ends) of the detection range R1 of the photodetector 4. As shown in FIG. 4, one end of the detection range R1 of the photodetector 4 is set to be parallel to the optical image S near the optical image S. This end is a touch surface T for detecting the position where the input object O (e.g., the finger in FIG. 4) has touched the optical image S. The touch surface T can coincide with the optical image S.

The detection range R1 of the photodetector 4 extends towards the far side of the touch surface T as seen from the advance direction (e.g., the approach direction) in which the input object O moves into the optical image S.

Figure 5:
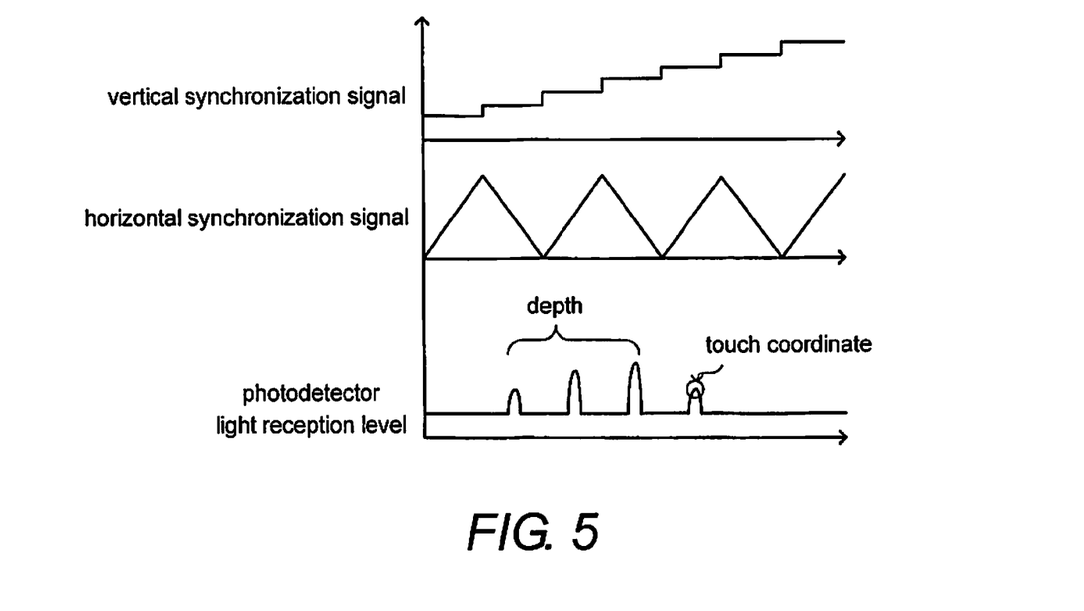
FIG. 5 is a timing chart illustrating an example of a vertical synchronization signal, a horizontal synchronization signal, and a light reception level of the photodetector.

FIG. 5 illustrates an example of a vertical synchronization signal and a horizontal synchronization signal. In the example in FIG. 5, the vertical synchronization signal is s stepped signal, while the horizontal synchronization signal is a triangular wave signal that increases or decreases at each step of the vertical synchronization signal. These synchronization signals deflect the horizontal MEMS mirror 3E and the vertical MEMS mirror 3F, so that the laser light emitted from the infrared laser unit 3 goes back and forth in the horizontal scanning direction (see FIG. 4) while scanning over the optical image S in the vertical scanning direction (see FIG. 4).

When the vertical scanning direction is from top to bottom, as illustrated in FIG. 4, first the laser light is reflected by the fingertip and detected by the photodetector 4. As the scanning proceeds, the laser light is successively reflected by the bottom of the finger and detected by the photodetector 4, until finally the laser light is reflected by the bottom of the finger and detected by the photodetector 4 near the touch surface T. At this point, as shown in FIG. 5, a group of light reception levels by the photodetector 4 appears along the time series of the synchronization signals. The controller 5 (see FIG. 2) detects, as a touch coordinate, the irradiation position coordinate of the laser light at the touch surface T based on the values of the vertical and horizontal synchronization signals (that is, the position of the MEMS mirrors) corresponding to the light reception level finally detected out of this group. The touch coordinate indicates the position of the optical image S touched by the input object O. The touch coordinate is a two-dimensional coordinate having a vertical coordinate and a horizontal coordinate.

Alternatively, when the vertical scanning direction is from bottom to top, then the touch coordinate can be detected based on the timing of the first detection out of the group of light reception levels.

In the illustrated embodiment, the controller 5 includes a microcomputer with a control program that controls various parts of the image display device 10. The controller 5 can also include other conventional components such as an input interface circuit, an output interface circuit, and storage devices such as a ROM (Read Only Memory) device and a RAM (Random Access Memory) device. The microcomputer of the controller 5 is programmed to control various parts of the image display device 10. The storage devices of the controller 5 stores processing results and control programs. The controller is operatively coupled to various parts of the image display device 10 in a conventional manner. The RAM of the controller 5 stores statuses of operational flags and various control data. The ROM of the controller 5 stores the programs for various operations. The controller 5 is capable of selectively controlling various parts of the image display device 10 in accordance with the control program. It will be apparent to those skilled in the art from this disclosure that the precise structure and algorithms for controller 5 can be any combination of hardware and software that will carry out the functions of the present invention. Furthermore, it will be apparent to those skilled in the art from this disclosure that the controller 5 can perform the processings described below with a plurality of microcomputers or processors, respectively, as needed and/or desired.

The controller 5 counts the number of scan lines (e.g., the scan line number), which is the number of times the light reception level is detected, except for the last time out of the above-mentioned group, that is, the number of laser lights reflected by the input object O, such as the finger. Then, the controller 5 detects the depth position based on the counted number of the scan lines. Of course, alternatively, all of the detections in one group can be used. For example, a table that specifies depth layer levels corresponding to the number of scan lines can be stored ahead of time in a memory of the controller 5, and the controller 5 can detect the depth layer level detected based on this table. For example, if the number of scan lines is from 0 to 5, for instance, then the depth layer level including the touch surface T can be specified as 0. If the number of scan lines is from 6 to 10, then the depth layer level can be specified as 1 that is deeper than the depth layer level 0. If the number of scan lines is from 11 to 15, then the depth layer level can be specified as 2 that is deeper than the depth layer level 1.

Thus, with this image display device 10, the single photodetector 4 can be used both to detect the touch coordinate and to detect the multi-stage depth. Thus, the number of parts can be reduced, which lowers the cost.

Figure 6:
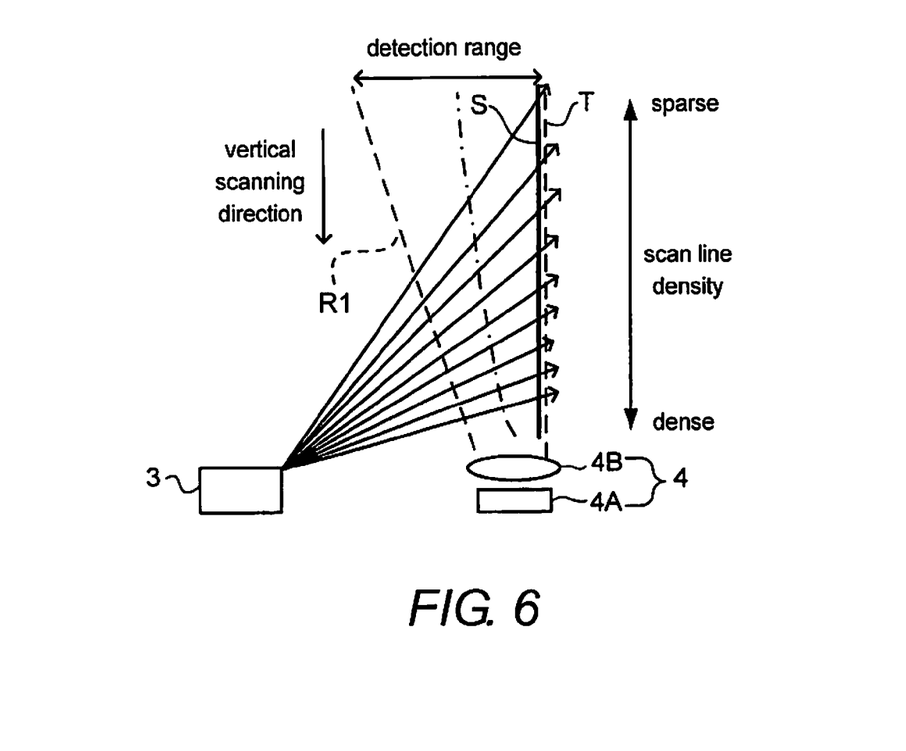
FIG. 6 is a schematic side elevational view of the image display device, illustrating an example of setting a depth to be nonparallel to a touch surface.

Here, if the scanning of the laser light in the vertical direction by the infrared laser unit 3 is performed at a constant speed, as shown in FIG. 6, then the scan lines become denser the lower down the scanning is on the touch surface T (i.e., the lower down in the vertical scanning direction), at which the distance between the infrared laser unit 3 and the touch surface T becomes shorter. Accordingly, if the depth layer levels are specified with respect to each constant number of the scan lines, then the depth layer levels cannot be set at a position parallel to the touch surface T, as indicated by the one-dot chain line in FIG. 6. Specifically, although the input object O advances to the same depth, the depth detection result by will vary with the position of the optical image S in the vertical direction. This can give an unnatural sensation to the user.

Figure 8:
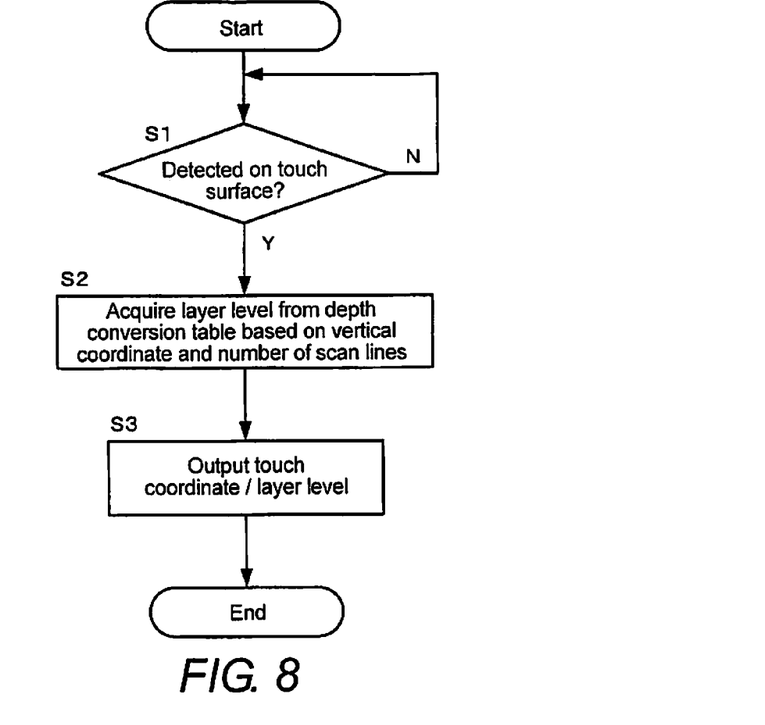
FIG. 8 is a flowchart illustrating a touch coordinate and depth detection processing.

In view of this, alternatively or additionally, the depth detection can be performed by the processing shown in FIG. 8. In step S1 in FIG. 8, if the controller 5 detects the touch coordinate and the number of the scan lines (Yes in step S1), then the flow proceeds to step S2. In step S2, the controller 5 acquires the depth layer level from a depth conversion table stored ahead of time in the controller 5, based on the counted number of scan lines and the vertical coordinate out of the detected touch coordinate.

Figure 7:
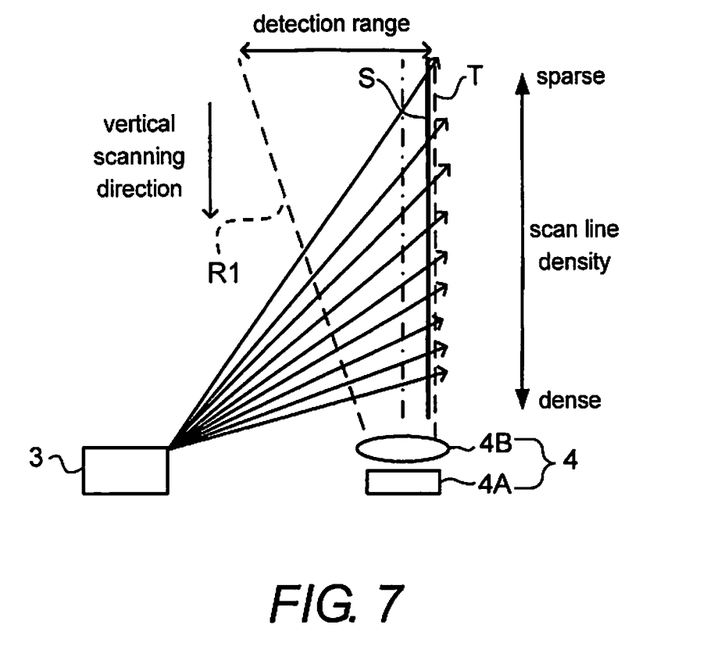
FIG. 7 is a schematic side elevational view of the image display device, illustrating an example of setting the depth to be parallel to the touch surface.
Figure 9:
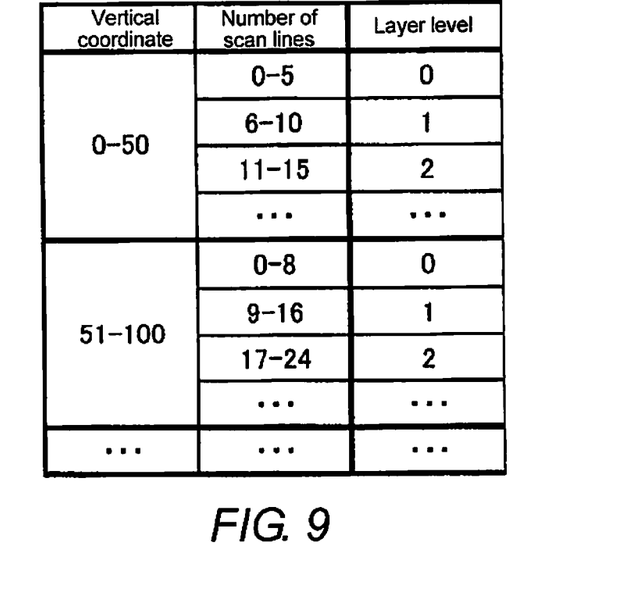
FIG. 9 is a diagram illustrating an example of a depth conversion table.

FIG. 9 illustrates an example of the depth conversion table. As shown in FIG. 9, the correlation between the number of scan lines and the depth layer level is specified for each vertical coordinate. In FIG. 9, the greater is the value of the vertical coordinate, the lower is the position on the touch surface T in FIG. 6. Also, the greater is the value of the vertical coordinate, the greater is the number of scan lines at a given depth layer level. Consequently, as shown by the one-dot chain line in FIG. 7, the depth can be set parallel to the touch surface T. Therefore, the depth detection result can be the same regardless of the vertical direction position when the input object O moves while maintaining a given depth. Thus, this can suppress the unnatural sensation of the user.

After step S2, in step S3, the controller 5 outputs the detected touch coordinate and the acquired depth layer level. Then, the processing in FIG. 8 is ended.

Only the vertical coordinate is used above. However, alternatively, only the horizontal coordinate can be used, or both the vertical coordinate and the horizontal coordinate can be used.

Next, an application example of using the touch coordinate detection and the depth detection will be described through reference to FIGS. 10 to 12. The application described here is a drag mode in which the input object O is pushed in.

Figure 10:
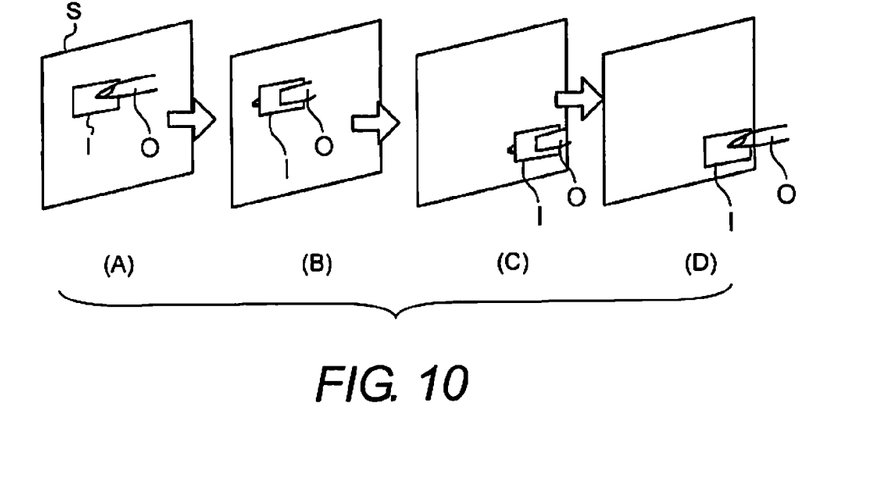
FIG. 10 is a schematic diagram illustrating a dragging of an icon.
Figure 11:
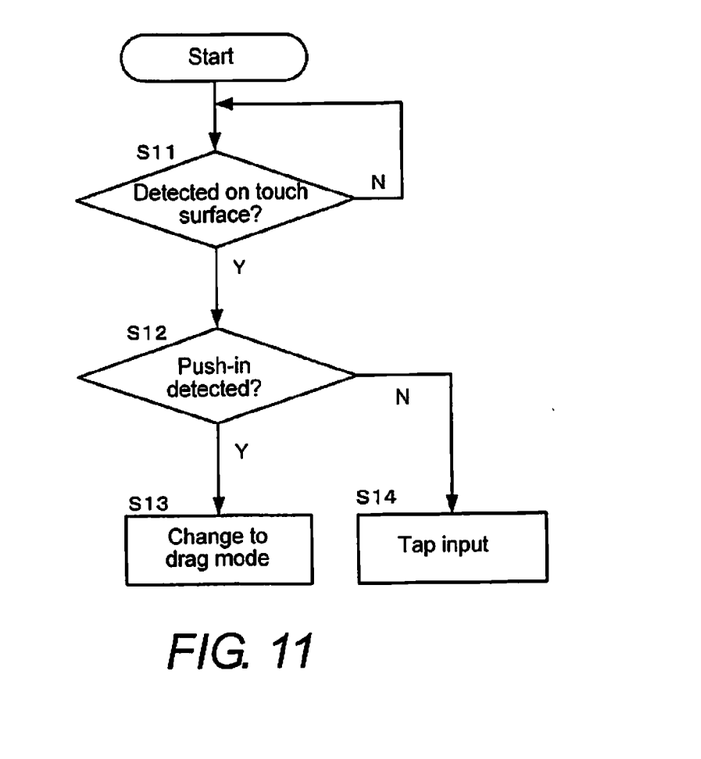
FIG. 11 is a flowchart illustrating a processing to change to drag mode.

At the start of the flowchart shown in FIG. 11, in step S11, the input object O, such as the finger and the like, touches the touch surface T (e.g., the state (A) in FIG. 10). When the controller 5 detects the touch coordinate (Yes in step S11), the flow proceeds to step S12.

In step S12, the controller 5 detects the depth layer level. If the detected layer level is determined to be at least a specific layer level, and the push-in of the input object O has been detected (Yes in step S12), then the flow proceeds to step S13 (e.g., the state (B) in FIG. 10). In step S13 the controller 5 changes to drag mode.

On the other hand, in step S12, if the controller 5 determines that the detected layer level has not reached the specific layer level, and the input object O has not been pushed in (No in step S12), then the flow proceeds to step S14. In step S14 the controller 5 performs processing as if a tap input has been performed. For example, if the finger touches the icon I and the finger is stopped in that state, as in the state (A) in FIG. 10, then the operation is performed as the tap input.

Figure 12:
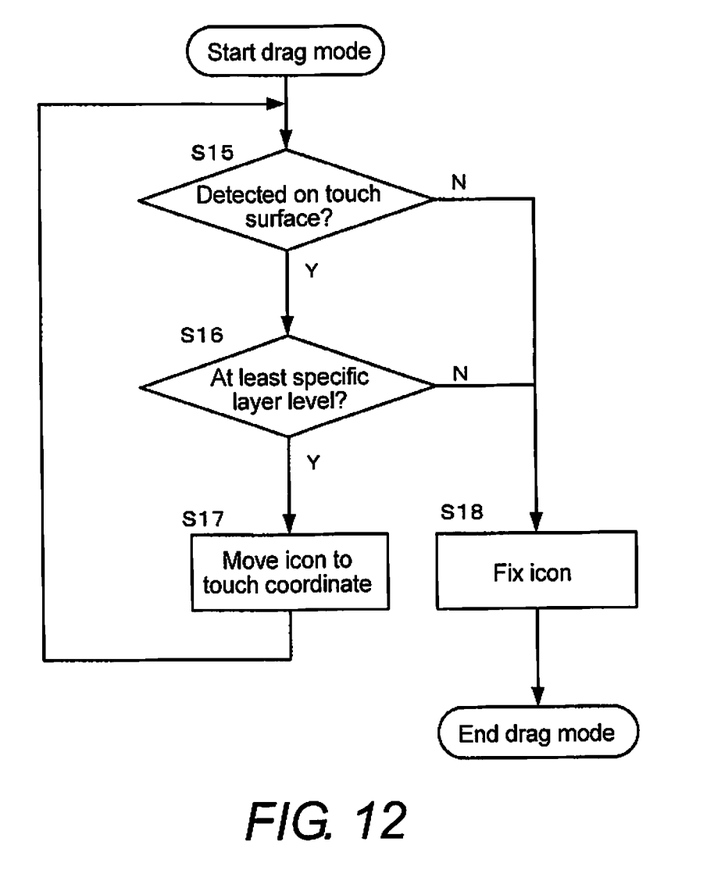
FIG. 12 is a flowchart illustrating a processing in the drag mode.

When the mode changes to the drag mode, the flowchart in FIG. 12 commences. In step S15, if the controller 5 detects the touch coordinate (Yes in step S15), then the flow proceeds to step S16. In step S16, if it is determined that the depth layer level detected along with the touch coordinate in step S15 is at least a specific layer level (Yes in step S16), then the flow proceeds to step S17. In step S17, the controller 5 controls the display of the liquid crystal display component 2 so as to move the icon to the position of the touch coordinate detected in step S15. The moved icon is an icon that includes the touch coordinate detected in step S11 (see FIG. 11). After step S17, the flow returns to step S15.

If the finger is pushed into the icon I to change to the drag mode, as in the state (B) in FIG. 10, then steps S15 to S17 are repeated. As a result, when the finger is moved while still pushed in, the icon I follows this movement, which results in the state shown in the state (C) in FIG. 10.

Then, in step S15, if the controller 5 cannot detect the touch coordinate (No in step S15), or if the touch coordinate is detected in step S15, but the specific layer level is not reached in step S16 (No in step S16), then the flow proceeds to step S18. In step S18, the controller 5 controls the display of the liquid crystal display component 2 so as to fix the icon.

Consequently, if the finger is pull away from the icon I as in the state (D) in FIG. 10 after the icon I has been dragged as in the state (C) in FIG. 10, then the icon I is fixed (i.e., the icon is dropped) by step S18.

Thus, a user interface in which the icon can be dragged over the optical image S can be achieved by the touch coordinate detection and the depth detection in this embodiment. Therefore, the icon can be manipulated more intuitively by the user.

Figure 13:
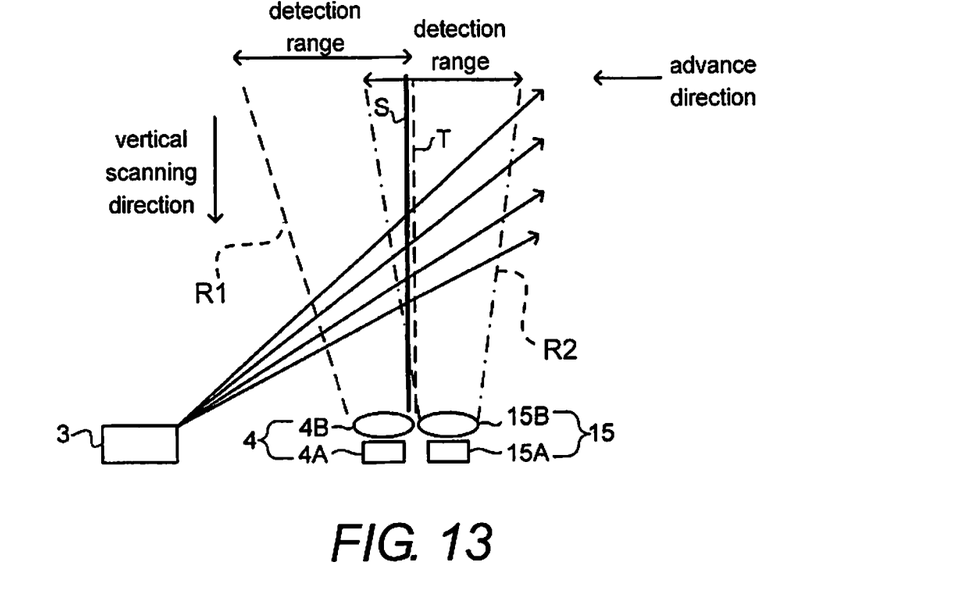
FIG. 13 is a schematic side elevational view of an image display device in accordance with a modified embodiment, with image display device having two photodetectors.

Next, a pull-out operation with the input object O will be described as an application example. In this embodiment, as shown in FIG. 13, the image display device 10 further includes a photodetector 15 (e.g., a second photodetector) separately from the photodetector 4. The photodetector 15 has a detection range R2 (e.g., a second detection range) as illustrated with one-dot chain lines in FIG. 13. The detection range R2 of the photodetector 15 is set more to the front side, as seen from the direction in which the input object O advances into the optical image S, than the detection range R1 of the photodetector 4 as illustrated with broken lines in FIG. 13. The photodetector 15 is similar to the photodetector 4 in that it includes a light receiving element 15A, a converging lens 15B, and a masking member (not shown) disposed therebetween. The detection signal from the light receiving element 15A is sent to the controller 5 (see FIG. 2).

The pull-out operation processing with this configuration will be described through reference to FIGS. 14 and 15. At the start of the flowchart in FIG. 15, in step S21, if the controller 5 detects two touch coordinates (Yes in step S21), then the flow proceeds to step S22. For example, as shown in the state (A) in FIG. 14, the two touch coordinates are detected if two fingers touch the optical image S.

In step S22, if the controller 5 determines that the distance between the two detected touch coordinates is within a specific distance (Yes in step S22), then the flow proceeds to step S23. For example, if the two fingers move closer as in the state (B) after the state (A) in FIG. 14, then the distance between the two touch coordinates is within the specific distance.

Then, in step S23, the controller 5 continues detecting the touch coordinates. If it is determined that the photodetector 4 no longer detects the reflected laser light from the input object O (Yes in step S23), then the flow proceeds to step S24.

In step S24, the controller 5 detects the position coordinates on the touch surface T for each laser light based on the values of the vertical and horizontal synchronization signals according to the timing at which the laser lights reflected by the tips of two input objects O are detected by the photodetector 15. If the distance between the detected position coordinates is within a specific distance (Yes in step S24), then the flow proceeds to step S25. In step S25, the controller 5 determines that the pull-out operation is performed.

Figure 14:
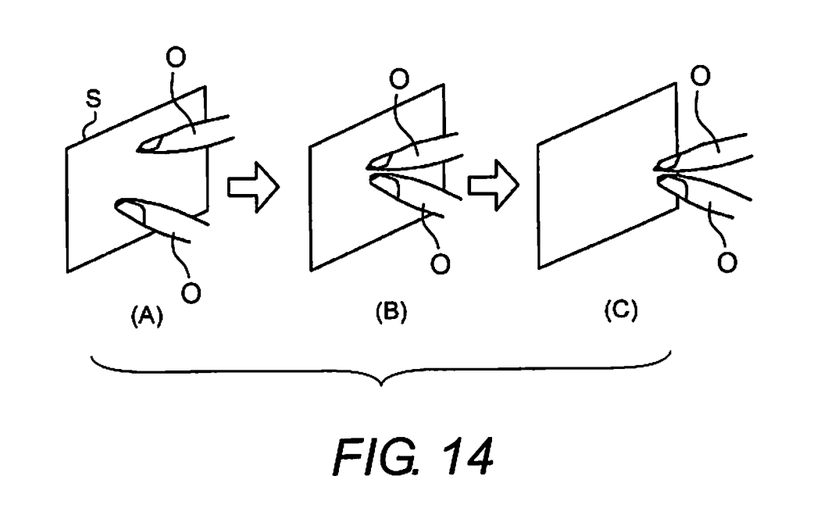
FIG. 14 is a schematic diagram illustrating a pull-out operation.
Figure 15:
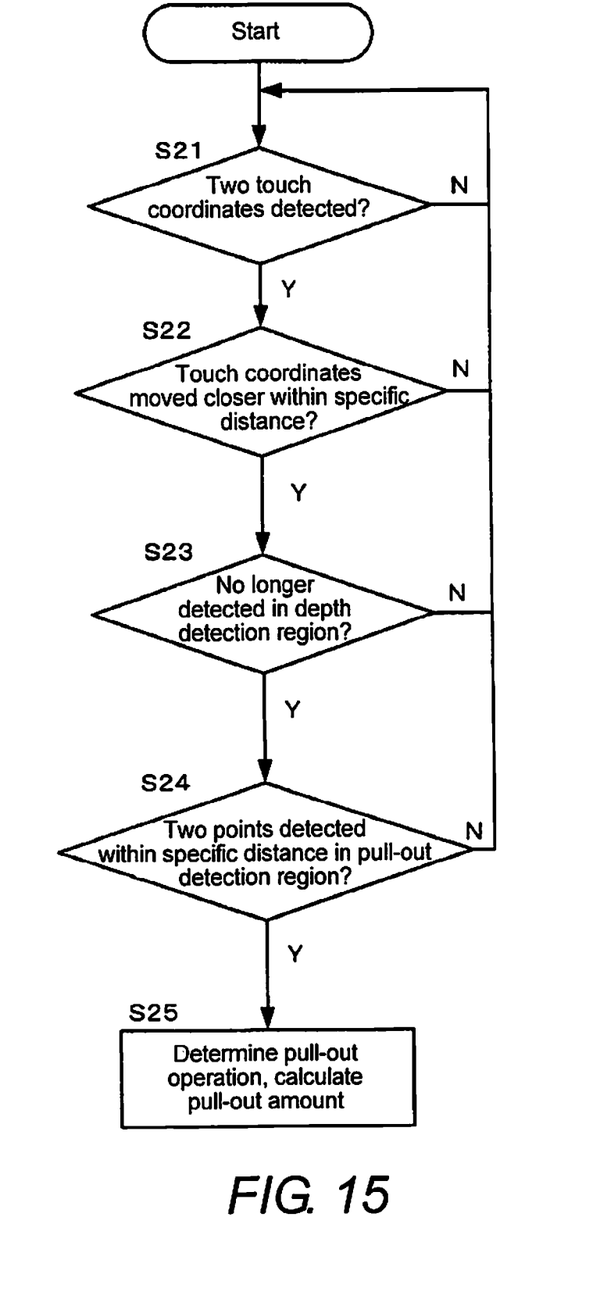
FIG. 15 is a flowchart illustrating a pull-out operation determination processing.

For example, after the state (B) in FIG. 14, if the two fingers are moved closer or pulled forward as in the state (C), then after the processing in steps S23 and S24, it is determined in step S25 that the pull-out operation is performed.

In step S25, the controller 5 detects the position coordinate of the laser light on the touch surface T based on the values of the vertical and horizontal synchronization signals according to the timing at which the laser light reflected by the tip of the input object O is detected by the photodetector 15. The pull-out amount of the input object O is calculated based on this detected position coordinate and the touch coordinate detected last when the detection of the touch coordinates is continued in step S23.

The controller 5 controls the display of the liquid crystal display component 2 so as to expand or shrink the image at the optical image S according to the pull-out amount, for example.

Thus, in this embodiment, a user interface in which input by the pull-out operation with the two input objects O can be achieved, which makes input more intuitive for the user.

An embodiment of the present invention is described above. However, various modifications to the embodiment are possible without departing from the scope of the present invention.

For example, the light beam scanned two-dimensionally is not limited to the infrared light, and can be a visible light. With this configuration, since the user can see the color when the visible light is reflected by the input object O, such as a finger, the user can recognize that the input object O is located in the scanning range of the light beam for sure.

In the illustrated embodiment, the image display device 10 (e.g., the spatial input device) includes the infrared laser unit 3 (e.g., the light beam scanner), the photodetector 4 (e.g., the photodetector), and the controller 5 (e.g., the controller). The infrared laser unit 3 is configured to emit laser beams (e.g., light beams) toward the spatially projected optical image S (e.g., the image) while two-dimensionally scanning the laser beams. The photodetector 4 is configured to detect the laser beams that have been reflected by the input object O, such as the finger, within the detection range R1. The detection range R1 extends inward of the image display device 10 relative to the optical image S. The controller 5 is configured to count the number of scan lines (e.g., the scan line number) indicative of the number of the laser beams that have been detected by the photodetector 4, and to detect the depth position of the input object O based on the number of scan line. In the illustrated embodiment, the controller 5 can perform the counting of the number of scan lines and the detecting of the depth position with a depth detector or detecting component that can be realized any combination of hardware and software.

With this configuration, the depth position of the input object O that has moved in deeper than the optical image S can be detected accurately and quickly by using the single photodetector 4. Therefore, the depth position can be detected accurately and quickly with a simple structure.

In the illustrated embodiment, the photodetector 4 is arranged such that one end of the detection range R1 is arranged to coincide with or be parallel to the optical image S, and such that the other end of the detection range R1 is disposed on a far side of the image display device 10 relative to the optical image S along the advance direction (e.g., the approach direction) of the input object O relative to the optical image S.

In the illustrated embodiment, the controller 5 is further configured to detect as the touch coordinate of the input object O the irradiation position coordinate of one of the laser lights that is finally or initially detected by the photodetector 4 at one end of the detection range R1 during the scanning of the infrared laser unit 3 based on the timing at which the photodetector 4 detects the one of the laser lights. In the illustrated embodiment, the controller 5 can perform the detection of the touch coordinate with a touch coordinate detector or detecting component that can be realized any combination of hardware and software.

With this configuration, in addition to the depth position, the position where the optical image S has been touched by the input object O can also be detected by using the single photodetector 4. This lowers the manufacturing cost.

In the illustrated embodiment, the controller 5 is further configured to detect the depth position based on the number of scan lines such that a correlation between the number of scan lines and the depth position varies according to the touch coordinate.

With this configuration, even if the density of the scan lines varies according to the scanning position, deviation or variance in the depth detection result depending on the touch position can be suppressed. This makes the operation feel more natural to the user.

In the illustrated embodiment, the controller 5 is further configured to switch between a plurality of processings based on whether or not the depth position (e.g., the depth layer level) is larger than a specific depth position (e.g., the specific layer level) in response to the touch coordinate being detected. In the illustrated embodiment, the controller 5 can perform the switching of the processings with a processing component that can be realized any combination of hardware and software.

With this configuration, the processings can be changed between a case in which the input object O has advanced deeper than the optical image S, and the input object O has been pushed in further, and a case in which the input object O has been stopped at the specific depth position.

In the illustrated embodiment, the controller 5 is further configured to move the icon I (e.g., the part of the image) to the touch coordinate in response to determining that the depth position is larger than the specific depth position.

With this configuration, if the input object O has advanced deeper than the optical image S, and the input object O has been pushed in further, then the mode can be changed to the drag mode in which the icon I or other specific image is made to follow the position of the input object O.

In the illustrated embodiment, the controller 5 is further configured to determine that the pull-out operation is performed in response to the photodetector 4 no longer detecting the touch coordinate after a plurality of touch coordinates have been detected. In the illustrated embodiment, the controller 5 can perform the determination of the pull-out operation with a determination component that can be realized any combination of hardware and software.

With this configuration, an operation in which a plurality of input objects O have advanced deeper than the optical image S and are then pulled out toward the user can be detected as the pull-out operation.

In the illustrated embodiment, the image display device 10 further includes the photodetector (e.g., the second photodetector) configured to detect the laser lights that have been reflected by the input object O within the detection range R2 (e.g., the second detection range). The detection range R2 extends outward of the image display device 10 relative to the detection range R2 of the photodetector 15.

Furthermore, in the illustrated embodiment, the controller 5 is further configured to determine that the pull-out operation is performed in response to the photodetector 4 no longer detecting the touch coordinate after a plurality of touch coordinates have been detected. Moreover, the controller 5 is further configured to calculate the pull-out amount of the input object O based on a detection result of the photodetector 15 in response to the controller 5 determining that the pull-out operation is performed. In the illustrated embodiment, the controller 5 can perform the calculation of the pull-out amount with a calculator or calculation component that can be realized any combination of hardware and software.

With this configuration, if the pull-out operation has been performed, then the pull-out amount can be calculated, and the operation corresponding to the pull-out amount can be performed.

With the present invention, the depth position can be detected accurately and quickly with a simple structure.

In accordance with a first aspect, a spatial input device comprises: a light beam scanner configured to emit light beams toward a spatially projected image while two-dimensionally scanning the light beams; a photodetector configured to detect the light beams that have been reflected by an input object within a detection range, with the detection range extending inward of the spatial input device relative to the image; and a controller configured to count a scan line number indicative of a number of the light beams that have been detected by the photodetector, and to detect a depth position of the input object based on the scan line number.

In accordance with a second aspect, with the spatial input device according to the first aspect, the photodetector is arranged such that one end of the detection range is arranged to coincide with or be parallel to the image, and such that the other end of the detection range is disposed on a far side of the spatial input device relative to the image along an approach direction of the input object relative to the image.

In accordance with a third aspect, with the spatial input device according to the first aspect, the controller is further configured to detect as a touch coordinate of the input object a irradiation position coordinate of one of the light beams that is finally or initially detected by the photodetector at one end of the detection range during a scanning of the light beam scanner based on a timing at which the photodetector detects the one of the light beams.

In accordance with a fourth aspect, the spatial input device according to the third aspect, the controller is further configured to detect the depth position based on the scan line number such that a correlation between the scan line number and the depth position varies according to the touch coordinate.

In accordance with a fifth aspect, the spatial input device according to the third aspect, wherein the controller is further configured to switch between a plurality of processings based on whether or not the depth position is larger than a specific depth position in response to the touch coordinate being detected.

In accordance with a sixth aspect, the spatial input device according to the fifth aspect, the controller is further configured to move a part of the image to the touch coordinate in response to determining that the depth position is larger than the specific depth position.

In accordance with a seventh aspect, the spatial input device according to the third aspect, the controller is further configured to determine that a pull-out operation is performed in response to the photodetector no longer detecting the touch coordinate after a plurality of touch coordinates have been detected.

In accordance with an eighth aspect, the spatial input device according to the first aspect, further comprises a second photodetector configured to detect the light beams that have been reflected by the input object within a second detection range, with the second detection range extending outward of the spatial input device relative to the detection range of the photodetector.

In accordance with a ninth aspect, the spatial input device according to the eighth aspect, the controller is further configured to determine that a pull-out operation is performed in response to the photodetector no longer detecting the touch coordinate after a plurality of touch coordinates have been detected, and the controller being further configured to calculate a pull-out amount of the input object based on a detection result of the second photodetector in response to the controller determining that the pull-out operation is performed.

In accordance with a tenth aspect, a spatial input device comprising: a light beam scanner that emits light beams toward a spatially projected image while two-dimensionally scanning the light beams; a photodetector that detects the light beams that have been reflected by an input object within a detection range, with the detection range extending inward of the spatial input device relative to the image; and a controller that counts a scan line number indicative of a number of the light beams that have been detected by the photodetector, and detects a depth position of the input object based on the scan line number, the controller further detecting the depth position of the input object based on a depth conversion table, with the depth conversion table specifying depth layer levels corresponding to scan line numbers.

In accordance with an eleventh aspect, with the spatial input device according to the tenth aspect, one end of the detection range is arranged to coincide with or be parallel to the image, and the other end of the detection range is disposed on a far side of the spatial input device relative to the image along an approach direction of the input object relative to the image.

In accordance with a twelfth aspect, with the spatial input device according to the tenth aspect, the controller further detects as a touch coordinate of the input object an irradiation position coordinate of one of the light beams that is finally or initially detected by the photodetector at one end of the detection range during a scanning of the light beam scanner based on a timing at which the photodetector detects the one of the light beams.

In accordance with a thirteenth aspect, with the spatial input device according to the tenth aspect, the controller further acquires a depth layer level from the depth conversion table based on the counted scan line number and a vertical coordinate out of the touch coordinate.

In accordance with a fourteenth aspect, with the spatial input device according to the tenth aspect, the depth conversion table specifies correlation between the scan line numbers and the depth layer levels for each vertical coordinate.

In accordance with a fifteenth aspect, with the spatial input device according to the tenth aspect, the controller further acquires a depth layer level from the depth conversion table based on the counted scan line number and a horizontal coordinate out of the touch coordinate.

In accordance with a sixteenth aspect, with the spatial input device according to the tenth aspect, the depth conversion table specifies correlation between the scan line numbers and the depth layer levels for each horizontal coordinate.

In accordance with a seventeenth aspect, with the spatial input device according to the thirteenth aspect, the depth conversion table divides the light beams into a plurality of beam groups each of which has the same scan line number, and specifies the depth layer levels with respect to the plurality of beam groups.

In accordance with an eighteenth aspect, with the spatial input device according to the thirteenth aspect, the depth conversion table divides the light beams into a plurality of beam groups the scan line number of which changes in accordance with increase or decrease of the vertical coordinate and/or the horizontal coordinate specified thereto, and specifies the depth layer levels with respect to the plurality of beam groups.

In accordance with a nineteenth aspect, with the spatial input device according to the twelfth aspect, the touch coordinate is a two-dimensional coordinate having a vertical coordinate and a horizontal coordinate.

In accordance with a twenties aspect, with the spatial input device according to the twelfth aspect, the controller further switches between a plurality of processings based on whether or not the depth position is larger than a specific depth position in response to the touch coordinate being detected.

In accordance with a twenty-first aspect, with the spatial input device according to the twenties aspect, the controller further moves a part of the image to the touch coordinate in response to determining that the depth position is larger than the specific depth position.

In accordance with a twenty-second aspect, with the spatial input device according to the twelfth aspect, the controller further determines that a pull-out operation is performed in response to the photodetector no longer detecting the touch coordinate after a plurality of touch coordinates have been detected.

In accordance with a twenty-third aspect, with the spatial input device according to the tenth aspect, a second photodetector that detects the light beams that have been reflected by the input object within a second detection range, with the second detection range extending outward of the spatial input device relative to the detection range of the photodetector.

In accordance with a twenty-fourth aspect, with the spatial input device according to the twenty-third aspect, the controller further determines that a pull-out operation is performed in response to the photodetector no longer detecting the touch coordinate after a plurality of touch coordinates have been detected, and the controller further calculates a pull-out amount of the input object based on a detection result of the second photodetector in response to the controller determining that the pull-out operation is performed.

In accordance with a twenty-fifth aspect, with the spatial input device according to the twelfth aspect, the depth conversion table specifies correlation between the scan line numbers and the depth layer levels according to the touch coordinate.

In accordance with a twenty-sixth aspect, with the spatial input device according to the tenth aspect, the depth position of the input object is indicative of an insertion amount of the input device that has been inserted within the detection range beyond an image plane defined by the image.

In accordance with a twenty-seventh aspect, with the spatial input device according to the tenth aspect, the depth position of the input object is indicative of a far side position of the input object relative to the image in a direction perpendicular to the image.

In accordance with a twenty-eighth aspect, with the spatial input device according to the tenth aspect, the depth conversion table specifies the depth layer levels non-parallel to an image plane defined by the image.

In accordance with a twenty-ninth aspect, with the spatial input device according to the tenth aspect, the depth conversion table specifies the depth layer levels parallel to an image plane defined by the image.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of an image display device in an upright position. Accordingly, these directional terms, as utilized to describe the image display device should be interpreted relative to an image display device in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A spatial input device comprising:
   a light beam scanner that emits light beams toward a spatially projected image while scanning the light beams;
   a photodetector that detects the light beams that have been reflected by an input object within a detection range; and
   a controller that counts a scan line number indicative of a number of the light beams that have been detected by the photodetector, and detects a position of the input object according to the counted scan line number using a table that specifies correlation between positions of the input object and scan line numbers.

2. The spatial input device according to claim 1, wherein one end of the detection range is arranged to coincide with or be parallel to the image, and the other end of the detection range is disposed on a far side of the spatial input device relative to the image along an approach direction of the input object relative to the image.

3. The spatial input device according to claim 1, wherein the controller further detects as a touch coordinate of the input object an irradiation position coordinate of one of the light beams that is finally or initially detected by the photodetector at one end of the detection range during a scanning of the light beam scanner based on a timing at which the photodetector detects the one of the light beams.

4. The spatial input device according to claim 3, wherein the touch coordinate is a two-dimensional coordinate having a vertical coordinate and a horizontal coordinate.

5. The spatial input device according to claim 3, wherein the controller further switches between a plurality of processings based on whether or not the position is larger than a specific position in response to the touch coordinate being detected.

6. The spatial input device according to claim 5, wherein the controller further moves a part of the image to the touch coordinate in response to determining that the position is larger than the specific position.

7. The spatial input device according to claim 3, wherein the controller further determines that a pull-out operation is performed in response to the photodetector no longer detecting the touch coordinate after a plurality of touch coordinates have been detected.

8. The spatial input device according to claim 3, wherein the table specifies the correlation between the positions of the input object and the scan line numbers according to the touch coordinate.

9. The spatial input device according to claim 1, wherein the controller further acquires the position of the input object from the table based on the counted scan line number and a vertical coordinate of the input object.

10. The spatial input device according to claim 1, wherein the table specifies the correlation between the positions of the input object and the scan line numbers for each vertical coordinate of the input object.

11. The spatial input device according to claim 1, wherein the controller further acquires the position of the input object from the table based on the counted scan line number and a horizontal coordinate of the input object.

12. The spatial input device according to claim 1, wherein the table specifies the correlation between the positions of the input object and the scan line numbers for each horizontal coordinate of the input object.

13. The spatial input device according to claim 1, wherein the table divides the light beams into a plurality of beam groups each of which has the same scan line number, and specifies layer levels with respect to the plurality of beam groups.

14. The spatial input device according to claim 1, wherein the table divides the light beams into a plurality of beam groups the scan line number of which changes in accordance with increase or decrease of a vertical coordinate and/or a horizontal coordinate specified thereto, and specifies layer levels with respect to the plurality of beam groups.

15. The spatial input device according to claim 1, further comprising
a second photodetector that detects the light beams that have been reflected by the input object within a second detection range, with the second detection range extending relative to the detection range of the photodetector.

16. The spatial input device according to claim 15, wherein
the controller further determines that a pull-out operation is performed in response to the photodetector no longer detecting a touch coordinate of the input object after a plurality of touch coordinates have been detected, and
the controller further calculates a pull-out amount of the input object based on a detection result of the second photodetector in response to the controller determining that the pull-out operation is performed.

17. The spatial input device according to claim 1, wherein the position of the input object is indicative of an insertion amount of the input device that has been inserted within the detection range beyond an image plane defined by the image.

18. The spatial input device according to claim 1, wherein the position of the input object is indicative of a far side position of the input object relative to the image in a direction perpendicular to the image.

19. The spatial input device according to claim 1, wherein the table specifies layer levels as the positions of the input object, the layer levels being defined non-parallel to an image plane defined by the image.

20. The spatial input device according to claim 1, wherein the table specifies layer levels as the positions of the input object, the layer levels being defined parallel to an image plane defined by the image.

* * * * *